US009219333B2

(12) United States Patent
Wang et al.

(10) Patent No.: US 9,219,333 B2
(45) Date of Patent: Dec. 22, 2015

(54) LOCKING DEVICE FOR ELECTRICAL CONNECTORS

(75) Inventors: Yingtao Wang, Guangdong (CN); Junmin Guo, Guangdong (CN)

(73) Assignee: HARTING ELECTRONICS GMBH, Espelkamp (DE)

( * ) Notice: Subject to any disclaimer, the term of this patent is extended or adjusted under 35 U.S.C. 154(b) by 10 days.

(21) Appl. No.: 14/240,821

(22) PCT Filed: Sep. 16, 2011

(86) PCT No.: PCT/CN2011/079734
§ 371 (c)(1),
(2), (4) Date: Feb. 25, 2014

(87) PCT Pub. No.: WO2013/037123
PCT Pub. Date: Mar. 21, 2013

(65) Prior Publication Data
US 2014/0235091 A1    Aug. 21, 2014

(51) Int. Cl.
*H01R 13/639*    (2006.01)
*H01R 13/627*    (2006.01)
*H01R 13/6592*   (2011.01)
*H01R 13/6594*   (2011.01)
*G02B 6/38*      (2006.01)
*G02B 6/42*      (2006.01)

(52) U.S. Cl.
CPC ............ *H01R 13/639* (2013.01); *G02B 6/3897* (2013.01); *G02B 6/4292* (2013.01); *H01R 13/6275* (2013.01); *G02B 6/3887* (2013.01); *G02B 6/4277* (2013.01); *H01R 13/6592* (2013.01); *H01R 13/6594* (2013.01)

(58) Field of Classification Search
CPC ............ H01R 13/639; H01R 13/6275; H01R 13/6594; G02B 6/3897; G02B 6/4277
USPC .......................... 439/350, 352, 353, 357, 258
See application file for complete search history.

(56) References Cited

U.S. PATENT DOCUMENTS

| | | |
|---|---|---|
| 6,434,015 B1 | 8/2002 | Hwang |
| 6,851,867 B2 * | 2/2005 | Pang et al. ...................... 385/88 |
| 7,056,156 B1 * | 6/2006 | Hanley et al. ................. 439/677 |
| 7,317,862 B2 | 1/2008 | Minota et al. |
| 7,507,111 B2 | 3/2009 | Togami et al. |
| 7,771,225 B1 * | 8/2010 | Wu ............................... 439/352 |
| 2009/0274468 A1 | 11/2009 | Zhang et al. |

FOREIGN PATENT DOCUMENTS

| | | |
|---|---|---|
| CN | 2548305 | 4/2003 |
| CN | 201207501 | 3/2009 |
| CN | 201584583 | 9/2010 |

* cited by examiner

*Primary Examiner* — Abdullah Riyami
*Assistant Examiner* — Marcus Harcum
(74) *Attorney, Agent, or Firm* — Jacobson Holman, PLLC.

(57) ABSTRACT

An electrical connector for contacting a mating connector is proposed which has a locking device and includes a locking mechanism by means of a tiltable locking latch. The spring-loaded unlocking mechanism is triggered by pulling on a pull tab and constitutes a secure locking connection between the electrical connector and the mating connector.

7 Claims, 7 Drawing Sheets

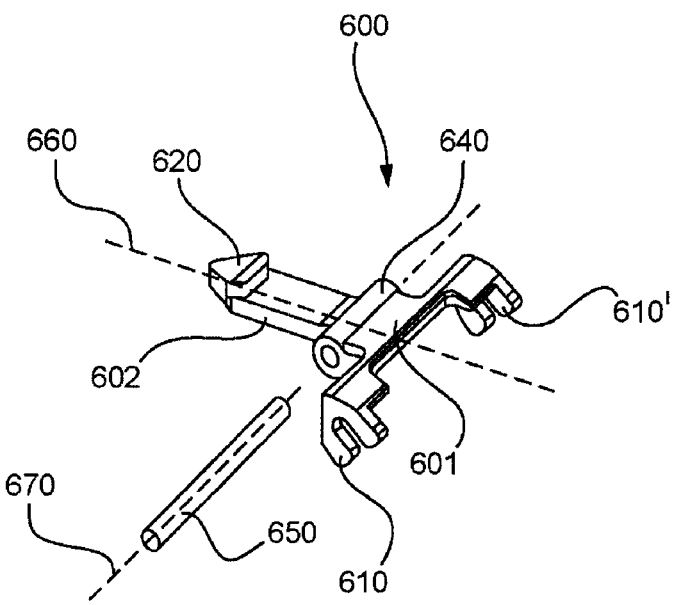
Fig. 6
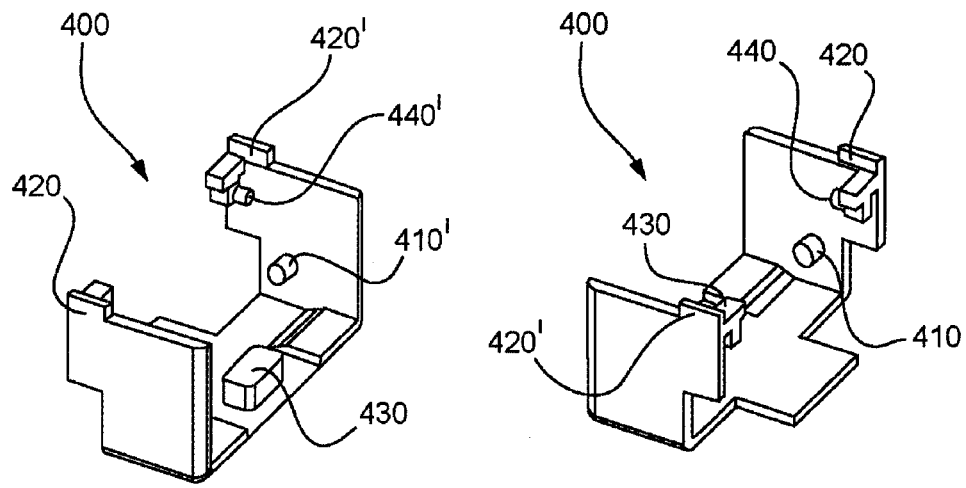
Fig. 7aFig. 7b

LOCKING DEVICE FOR ELECTRICAL CONNECTORS

This is a national stage of PCT/CN11/079734 filed Sep. 16, 2011 and published in English, hereby incorporated by reference.

BACKGROUND OF THE INVENTION

The present invention relates to a locking device for an electrical connector comprising a two-part shell with a cable side for electrical cables and a connecting side in form of a printed circuit board with electrical contacts for directly contacting a mating connector, and a locking latch, in which the electrical connector is automatically locked with the mating connector when it is pushed into the mating connector.

Locking devices of this type are required in electrical connectors which are joined to shield mating connectors, so-called cages. These connectors, which are also known as SFPs, are used to transmit signals with high data rates such as, for example, in an Ethernet. These connectors are used for two-core copper wires but are also designed for electro-optical transducers, suitable for fibre-optic cables.

A number of locking mechanisms for such connectors are already known from the prior art which effect the locking and unlocking of the connectors to and from the said cages in many different ways. An optical transducer module with a similar structure is known from U.S. Pat. No. 7,507,111 which can be unlocked by means of a rotatable lever. The small moving parts of the locking mechanism are here situated on the outside and are freely accessible, as a result of which they are not protected from damage and dirt.

BRIEF SUMMARY OF THE INVENTION

The object of the present invention is to provide an SFP connector with an unproblematic locking and unlocking mechanism which can be easily manipulated.

This object is achieved by the locking device wherein inside the sliding element a locking latch is arranged, wherein the sliding element is arranged inside the two-part shell for a displacement of a certain distance, wherein the locking latch is mounted rotatably inside a mount of the bottom shell, and wherein a hook on the locking latch performs a short lifting movement when the sliding element is displaced axially, so that an unlocking or locking action with the correspondingly provided mating connector results.

Advantageous embodiments of the invention are given in the subclaims.

The invention relates to a shielded electrical connector for high-frequency data transmissions in a Gigabit Ethernet. These connectors have an extremely slim design, both glass fibres and copper wires being provided as the transmission medium. The version described here uses passive copper wires which, compared with the fibre-optic versions, have the advantage of low power consumption. However, the proposed locking device can also be readily applied to an SFP connector which takes the form of an electro-optical transducer.

The connecting side of this so-called SFP connector (SFP=Small Form-Factor Pluggable) has a printed circuit board with contact surfaces for contacting corresponding contacts of a mating connector. The design and dimensions of the connecting side of the connector shell are here provided with standard dimensions.

The connector shells are metallically shielding and equipped with an unlocking mechanism which can be actuated by means of a pull tab provided on the cable side.

A connector of this type is joined to a so-called cage, a shielded mating connector, which as a rule is in turn installed directly on printed circuit boards inside a shell for switches, routers or bus adapters—in other words, in equipment used in an Ethernet. The connectors can thereby be pushed into corresponding openings in the shell and force-latched there when they are pushed into the mating connector.

In addition, a spring-loaded unlocking mechanism is provided with a pull tab for unlocking the mating connector. It is here particularly advantageous that the locking apparatus is, in contrast to the prior art, arranged inside the connector shell so that the parts which would otherwise be situated on the outside of the locking mechanism cannot be moved or damaged.

The cable connection of the individual signal wires is not described in detail as this does not appear to be relevant here. It is sufficient to say that the individual strands are arranged such that they are combined, cast as a block and contact the printed circuit board. The contact tracks which stand out on the printed circuit board on the connecting side thereby make contact with corresponding electrical contacts of a mating connector.

The connector, which is here formed from two parts, a bottom shell and a top shell, and has a printed circuit board arranged inside for transmitting signals, advantageously hooked in by means of a mechanism formed on the connecting side, is joined together and is screwed together by two screws.

The locking mechanism situated on the inside of the connector essentially consists of a locking latch and a sliding element. A pull tab is attached to the sliding element on the cable side, by means of which the sliding element can be moved counter to the plug-in direction, this movement being reversible by springs.

In addition to the sliding element, the locking mechanism also has a tiltable locking latch. The latter locks the connector to the mating connector on its outside. The axial movement of the sliding element is transmitted to the locking latch by means of two guiding pins which are each guided in a forked guide of the locking latch.

The locking latch is a T-shaped element and, below the upper transverse region, has an axle mount extending parallel to the transverse region and through which an axle is guided, the axle being retained in an axle bore of the shell. This mounting of the locking latch ensures that the locking latch can rotate freely in the shell.

The forked guides of the locking latch are provided at the outer ends of the transverse region of the T-shape. They are arranged at an angle directed towards the inside of the connector, with respect to the axial movement of the sliding element, and form a first lever part of the locking latch. As a result of this arrangement of the forked guides, the locking latch is rotated about the axle by a certain angle when the sliding element is moved axially by means of the first lever part.

The rotation of the locking latch is transmitted to a second lever part which is formed by the elongated region of the T-shape. A hook is provided on the outer surface of the second lever part for latching in a corresponding recess in the mating connector. Rotation of the locking latch causes the hook to make a short lifting movement into the connector shell and releases the locking connection to the mating connector.

The locking connection is thus released by a pulling movement on the pull tab counter to the plug-in direction and the connector can be removed from the mating connector.

BRIEF DESCRIPTION OF THE SEVERAL VIEWS OF THE DRAWING

An exemplary embodiment of the invention is explained in more detail below and illustrated in the drawings, in which:

FIG. 3b shows a detailed view from FIG. 3a,

FIG. 4a shows the outside of the bottom shell from FIG. 3a,

FIG. 4b shows a detailed view from FIG. 4a,

FIG. 5b shows a detailed view from FIG. 5a,

FIG. 6 shows a single locking latch,

FIG. 7a shows a single sliding element from the cable connection direction,

FIG. 7b shows the sliding element from FIG. 7a from the plug-in direction,

DETAILED DESCRIPTION OF THE INVENTION

Figure 1:
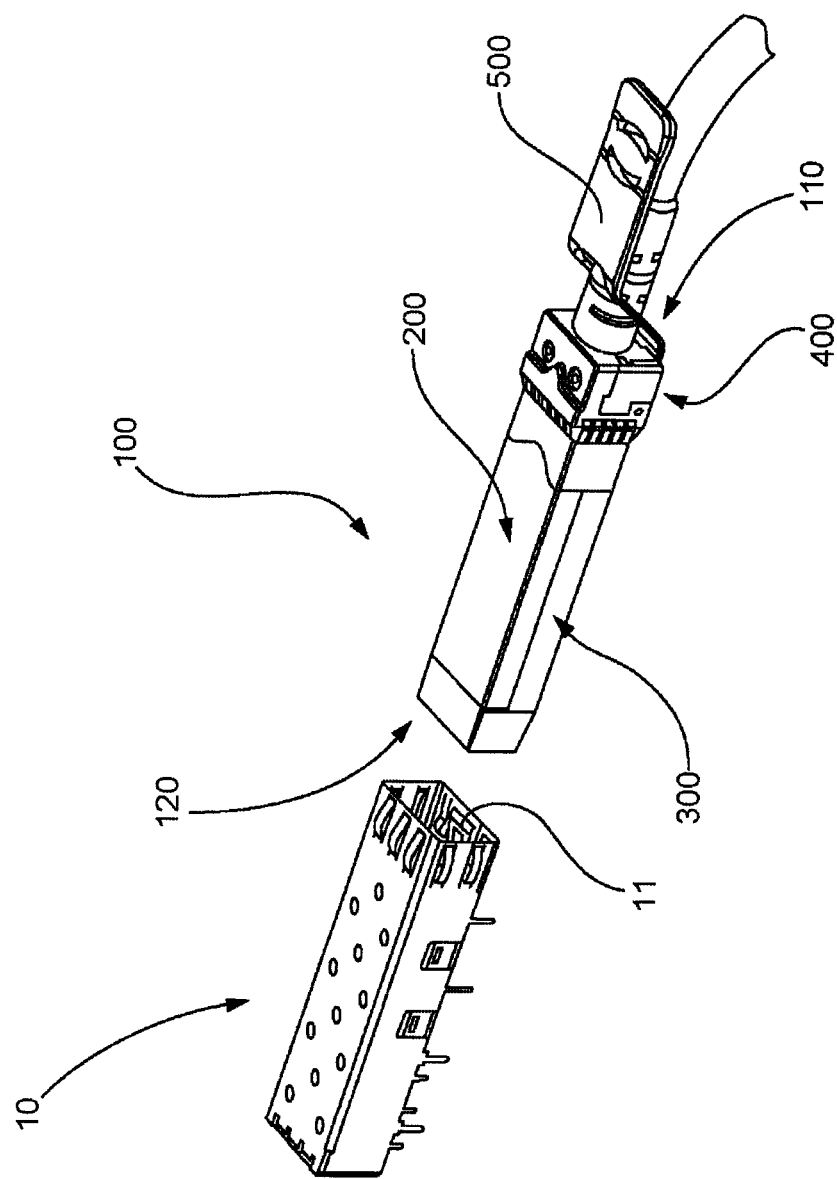
FIG. 1 shows a connector according to the invention with a mating connector.

An electrical connector 100 according to the invention and a mating connector 10 provided for it are shown in FIG. 1. The connector 100 is formed from two shell halves—a top shell 200 and a bottom shell 300—and has a connecting side 120 and a cable side 110.

An unlocking mechanism which can be actuated by means of a pull tab 500 which can be displaced by a certain axial range is arranged inside the two shells. The pull tab is expediently fastened to a sliding element 400 which is a component of the unlocking mechanism.

Figure 2:
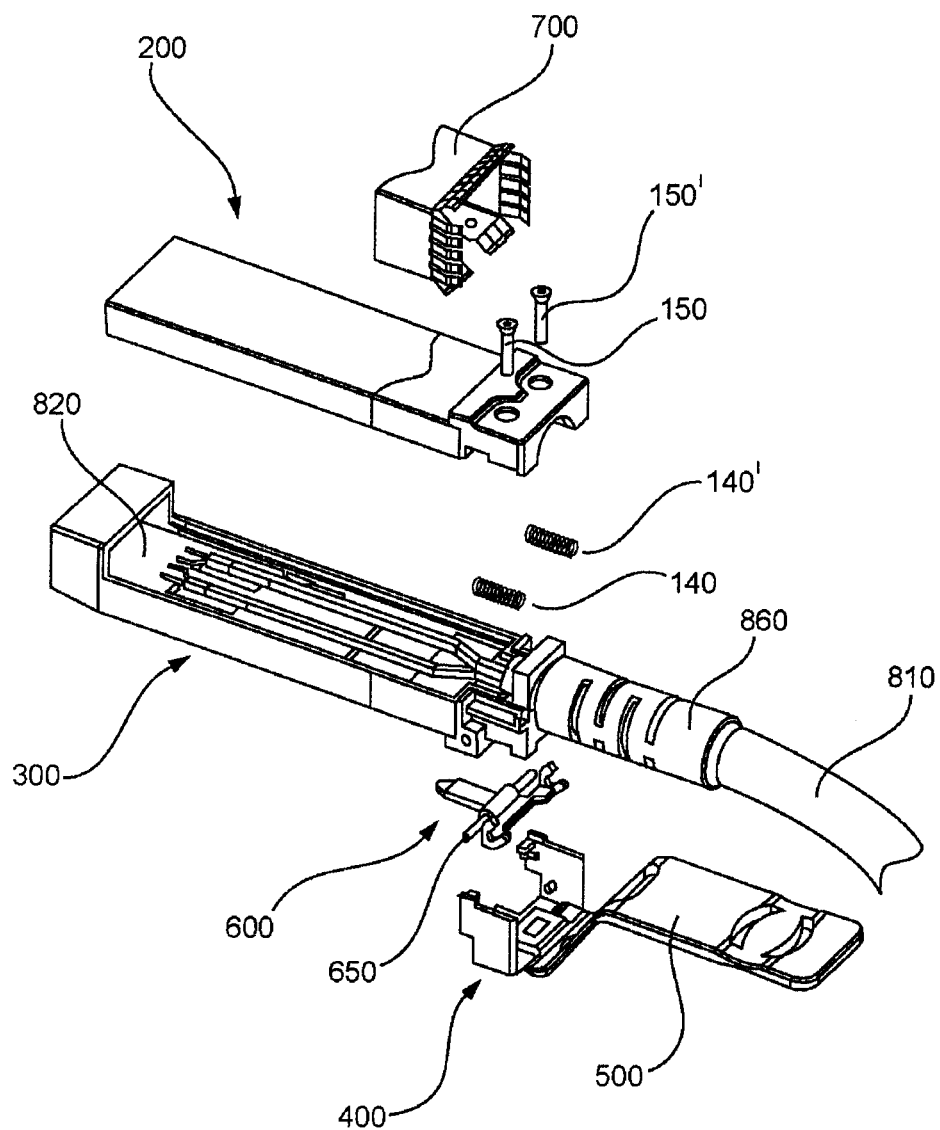
FIG. 2 shows an exploded view of the connector.

FIG. 2 shows in an exploded representation an overall view of the individual parts belonging to the connector.

The bottom shell 300 is first shown here with the top shell 200 arranged above it. A printed circuit board 820 with an electrical cable 810 attached to it and a strain relief 860 surrounding the cable 810 is inserted in the bottom shell 300. The sliding element 400 and a tiltable locking latch 600 which belongs to the unlocking mechanism are shown below the bottom shell 300. A separate axle 650 is provided on the locking latch 600, can be pushed into an axle mount 640 on the locking latch 600 (see FIG. 6) and into an axle bore 350, 350' on the bottom shell 300 (see FIG. 4b) and thus permits a rotational movement of the locking latch 600 about the axle 650. The unlocking mechanism is completed by the pull tab 500 and two coil springs 140, 140' acting on the sliding element 400.

A shielding element 700 is provided to transfer the shielding effect from the electrical connector 100 to the mating connector 10.

Figure 3A:
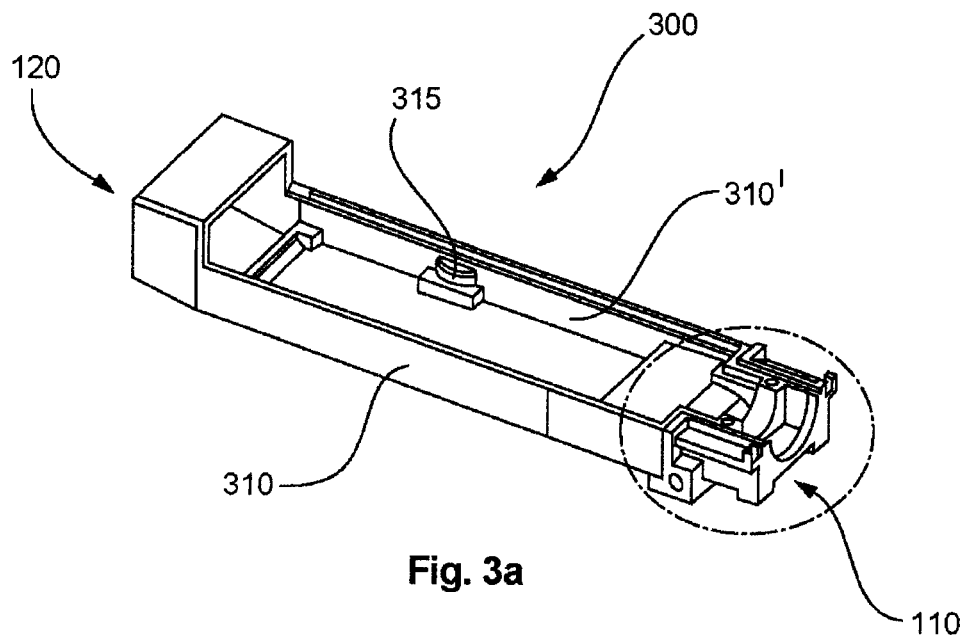
FIG. 3a shows the inside of a single bottom shell.
Figure 3B:
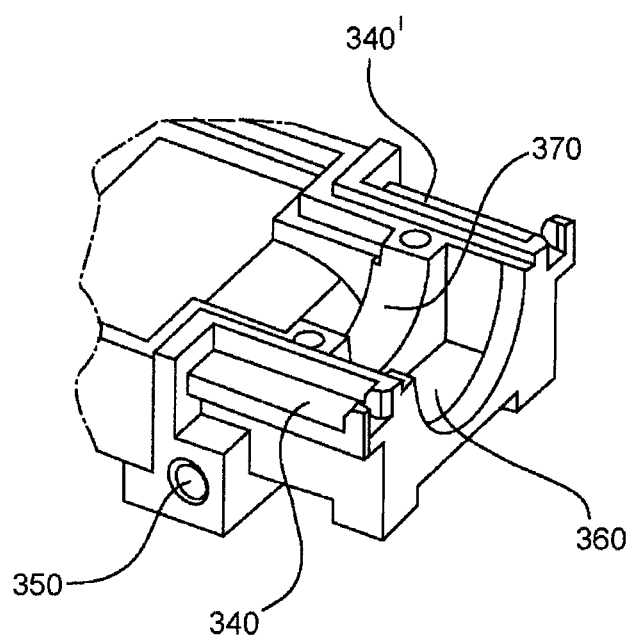

The bottom shell 300 is shown in greater detail in FIG. 3a and FIG. 3b. It has a half-open shell with two side walls 310, 310', a cable fixing 370 formed on the cable side, and an open connecting side 120.

On the inner sides of the side walls 310, 310', in the front region of the bottom shell 300 facing the connecting side 120, a staircase-shaped formation 315, 315' is provided in each case, on which the printed circuit board 820 rests when the latter is inserted into the electrical connector 100, while two mouldings 215, 215' which fix the printed circuit board 820 from the other side are provided in the top shell 200. The fixing of the printed circuit board 820 on the connecting side 120 is important because the contacting with the mating connector 10 is effected via the electrical contacts 830 located on the said printed circuit board 820.

To achieve an EMC-sealed shell, stepped projections are provided on the edges of the side walls 310, 310' and on the edges of the side walls 210, 210' of the top shell 200 and engage inside each other when the two shells 200, 300 are assembled so that a type of labyrinth seal results.

On the cable side 110, a mount 360 for the strain relief 860 of the electrical cable 810 is additionally provided in the bottom shell 300 next to the cable fixing 370. Two recesses which serve as a spring mount 340, 340' for the coil springs 140, 140' are provided on the inside of the lateral ends of the bottom shell 300.

Figure 4A:
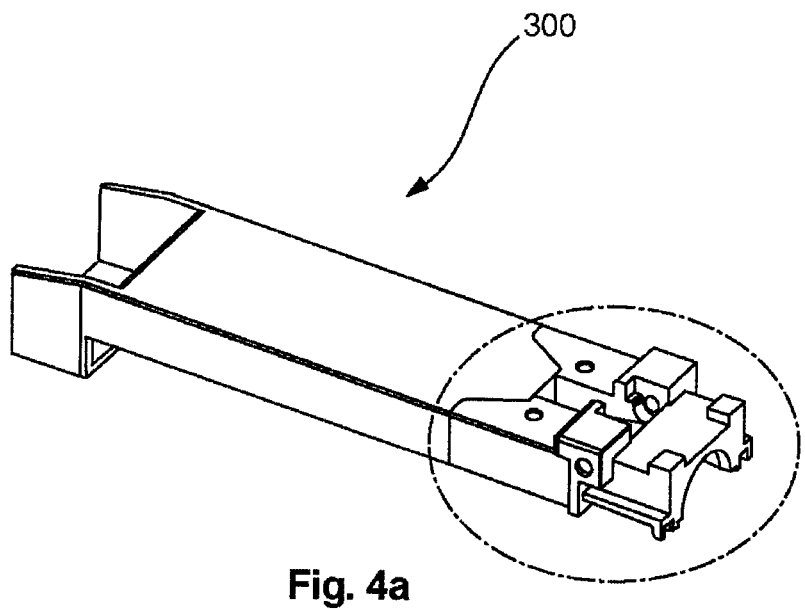
Figure 4B:
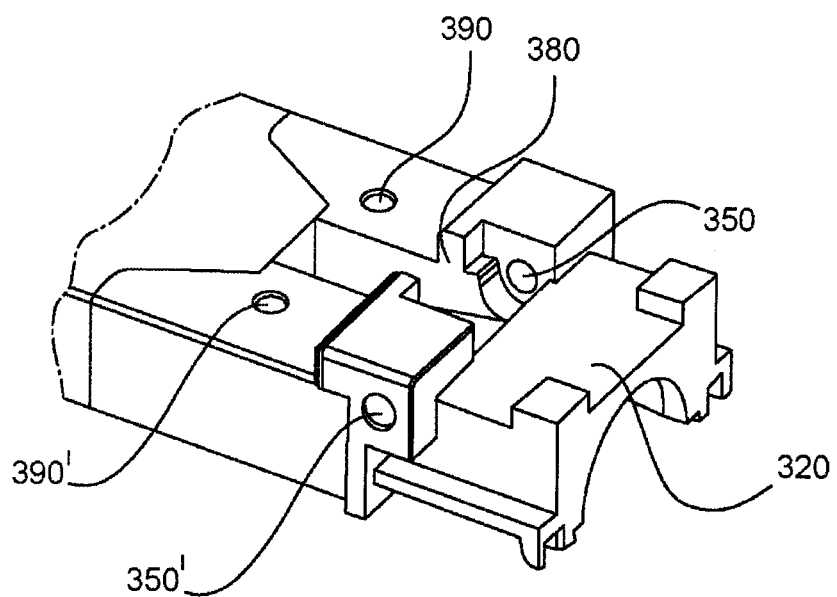

FIG. 4a and FIG. 4b show the bottom shell 300, also in a detailed view but from the outside. A mount 380 in which the locking latch 600 can be placed is formed on the cable side 110 in the bottom shell 300. The axle 650 is pushed through the axle bore 350, 350' and the axle mount 640 of the locking latch 600, as a result of which the locking latch 600 is housed rotatably on the bottom shell 300. The axle bore 350, 350' is provided in the bottom shell 300 to receive the axle 650. Bores 390, 390' situated on the outside of the bottom shell 300 serve to fix the shielding element 700.

The outer cable connection end 320 of the bottom shell 300 is provided so that it is enclosed by the sliding element 400, as a result of which the unlocking mechanism situated inside is protected.

Figure 5A:
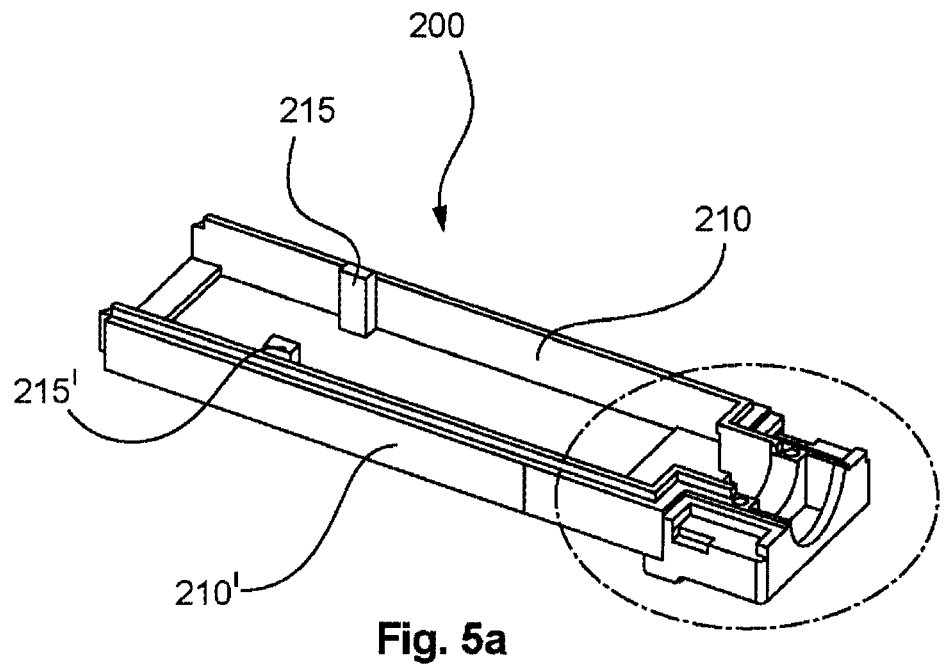
FIG. 5a shows the inside of a single top shell.
Figure 5B:
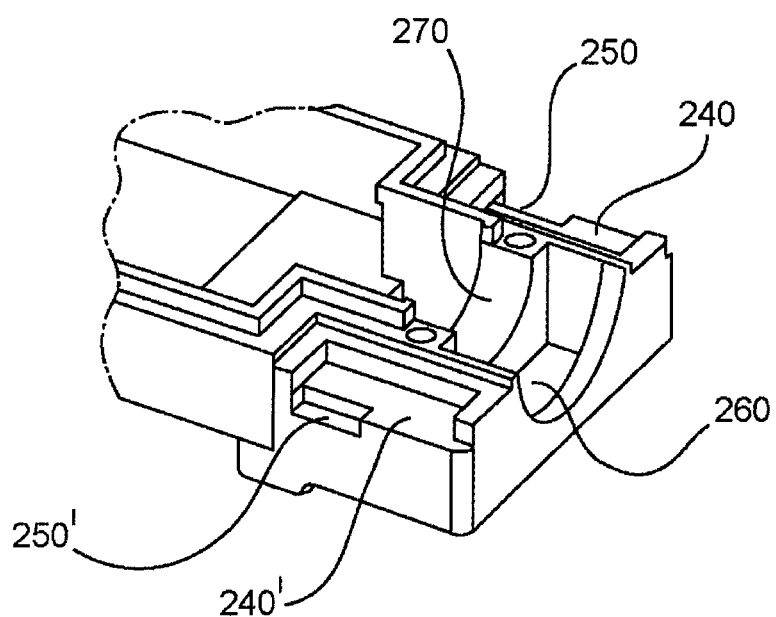

The top shell 200 is shown in detail in FIG. 5a and FIG. 5b. The already mentioned side walls 210, 210' with the stepped projections can be seen in FIG. 5a, which form an EMC-sealed shell in conjunction with the side walls 310, 310' of the bottom shell 300. As illustrated in FIG. 3a and FIG. 3b, the mouldings 215, 215' serve to fix the printed circuit board 820 in the assembled shell 200, 300.

The detailed view in FIG. 5b shows a cable fixing 270 and a strain relief mount 260 which each interact with the elements 370 and 360 on the bottom shell 300. Recesses which serve as spring mounts 240, 240' for the coil springs 140, 140' are provided on the inside of both elongated sides of the cable connection end.

A notch which forms a sliding track range 250, 250' is in each case provided in the spring mounts 240, 240'. The sliding element 400 engages in the sliding track range 250, 250' on both sides with provided sliding stoppers 420, 420' in such a way that it limits the maximum sliding travel (see FIG. 8a and FIG. 8b).

FIG. 6 shows a single locking latch 600 which is provided for mounting in the bottom shell 300. The locking latch 600 is a T-shaped element, the transverse region of the "T" forming a first lever part 601 and the elongated region of the "T" forming a second lever part 602.

A sleeve-like axle mount 640 directed parallel to the transverse region of the "T" joins the first lever part 601 to the second lever part 602. The axle mount 640 serves as the pivot point for the locking latch 600. The axle 650 shown in the foreground, by means of which the locking latch 600 is housed rotatably on the bottom shell 300, is guided through the axle mount 640. The axle 650 is a component which is here designed as a slotted spring pin which is inserted with spring tension into the bore 350, 350' in the bottom shell 300 to prevent it from falling out.

At the outer ends of the first lever part 601, a forked guide 610, 610' is in each case provided, the opening of which is oriented at an angle of, for example, here 45° with respect to the centre line 660 of the locking latch 300. The two forked guides 610, 610' are spaced apart from each other by such a distance that the cable connection end 320 can be accommodated between them and that the sliding element 400 can engage around the locking latch 600.

The second lever part 602 has at its end a hook 620 which is arranged in such a way that, with respect to the centre line 660 of the locking latch 600, it lies on the opposite side to the forked guides 610, 610' on the first lever part 601. The hook 620 has a triangular design corresponding to a recess 11 on the mating connector 10 into which the hook 620 latches in the locked situation. The hook 620 is flattened at the end facing the second lever part 602 in order to enable the mating connector to be locked. When locking the electrical connector 100 to the mating connector 10, it is not necessary to release the unlocking mechanism as the mating connector 10 is latched on the hook 620 by elastic deformation.

FIG. 7a and FIG. 7b show a sliding element 400 from the cable connection direction and plug-in direction, respectively. The sliding element 400 is a thin-walled U-shaped component. It is mounted on the cable connection end 320 of the bottom shell 300, the locking latch 600 being arranged between the cable side 320 and the sliding element 400.

A moulding 430, which serves to receive and fasten the pull tab 500, is provided in the centre of the lower part of the sliding element 400 on the inside. Sliding stoppers 420, 420' are integrally formed on the lateral arms of the sliding element 400. These sliding stoppers 420, 420' engage in the sliding track ranges 250, 250' on the upper shell 200 and limit the maximum axial sliding travel of the sliding element 400.

A mounting pin 440, 440' for the coil springs 140, 140', and guiding pins 410, 410' around which engage the forked guides 610, 610' of the locking latch 600, are in each case situated on the insides of the lateral arms of the sliding element 400.

The mounting pins 440, 440' move with the sliding element 400 inside the spring mounts 240, 240', 340, 340' of the shell 200, 300. When the pull tab 500 is pulled, the sliding element 400 is thus moved counter to the plug-in direction by an axial sliding distance, as a result of which the coil springs 140, 140' are compressed by means of the mounting pins 440, 440' on the sliding element 400. When the pull tab 500 is released, the sliding element 400 is displaced back into the starting position by the energy of the coil springs 140, 140'.

During the movement of the sliding element 400, the guiding pins 410, 410' act on the forked guides 610, 610' of the locking latch 600 which are guided about the pins. When the unlocking mechanism is actuated, the guiding pins 410, 410' cause the locking latch 600 to tilt relative to the fixed but rotatable axle mount 640, as a result of which the second lever part 602 is pulled into the bottom shell 300 with the hook 620 and the locking connection to the mating connector 10 is disengaged.

When the pull tab 500 is released, the guiding pins 410, 410', in conjunction with the forked guides 610, 610', cause the locking latch 600 to be returned. This spring-loaded returning of the sliding element 400 ensures a secure locking connection between the electrical connector 100 and the mating connector 10.

Figure 8A:
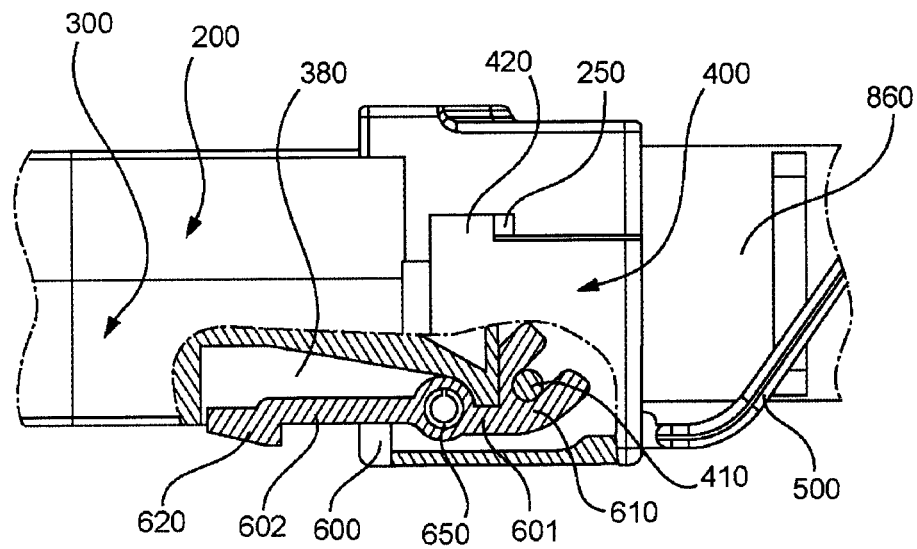
FIG. 8a shows a partially cutaway connector in the locking position.

The cable connection end of a electrical connector is shown in FIG. 8a in a portion of the electrical connector 100 in the locking position, the unlocking mechanism being shown in partial section.

The locking latch 600 is situated in a horizontal locking position parallel to the electrical connector 100. The hook 620 projects out of the electrical connector 100 in order to permit locking to the mating connector 10. The sliding element 400 is pressed by the coil springs 140, 140' acting inside into a front end position which is defined by the sliding stopper 420 in the sliding track range 250. The guiding pin 410 of the sliding element 400 is situated on the innermost point of the forked guide 610 of the locking latch 600, as a result of which the locking latch 600 is prevented from rotating.

Figure 8B:
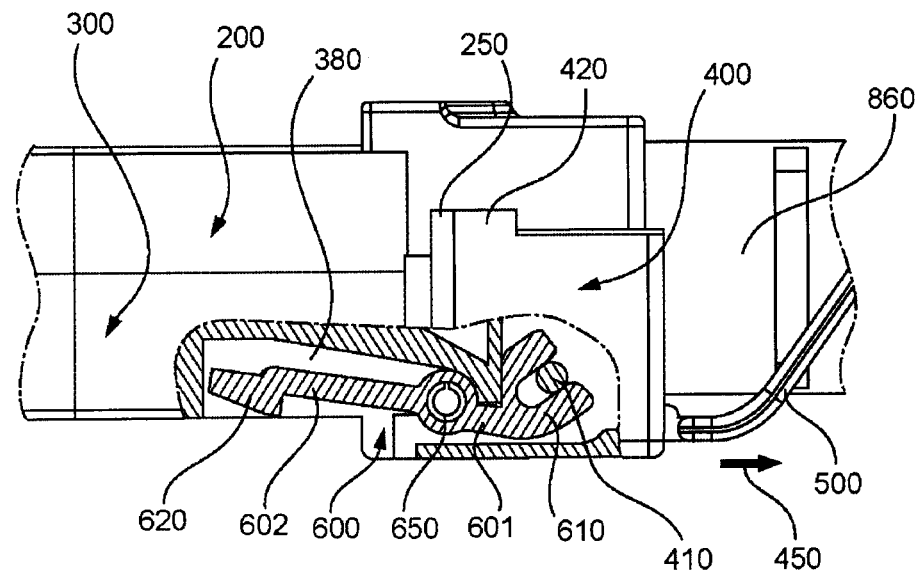
FIG. 8b shows the partially cutaway connector from FIG. 8a in the unlocking position.

Lastly, FIG. 8b shows the cable connection end of the electrical connector from FIG. 8a in the unlocking position, the unlocking mechanism also being shown here in partial section.

The sliding element 400 is pulled into a rear end position by the actuation of the pull tab 500 counter to the spring action. The rear end position shown is, like the front end position from FIG. 8a, also defined by the sliding stopper 420 in the sliding track range 250. The sliding travel of the sliding element 400 which releases the unlocking mechanism counter to the spring action is shown by the arrow 450.

The guiding pin 410 shifted counter to the plug-in direction with the sliding element 400 acts on the forked guide 610 and causes the locking latch 600 to rotate clockwise about the axle 650. The rotation of the locking latch 600 causes a short lifting movement of the hook 620, which thereby retracts into the shell 200, 300 and releases a locking connection to a mating connector 10.

LIST OF REFERENCE NUMERALS 10 mating connector
11 recess
100 electrical connector
110 cable side
120 connecting side
140, 140' coil spring
150, 150' screw
200 top shell
210, 210' side wall
215, 215' moulding
240, 240' spring mount
250, 250' sliding track range
260 strain relief mount
270 cable fixing
300 bottom shell
310, 310' side wall
315, 315' staircase-shaped formation
320 cable connection end
340, 340' spring mount
350, 350' axle bore
360 strain relief mount
370 cable fixing
380 mount
390, 390' bore
400 sliding element
410, 410' guiding pin
420, 420' sliding stopper
430 moulding
440, 440' mounting pin for coil spring
450 sliding travel
500 pull tab
600 locking latch
601 first lever part
602 second lever part
610, 610' forked guide
620 hook
640 axle mount
650 axle
660 centre line
670 axis of rotation
700 shielding element
810 electrical cable
820 printed circuit board 830 electrical contacts
860 strain relief

The invention claimed is:

1. A locking device for an electrical connector (100) comprising a two-part shell (200, 300) with a cable side (110) for electrical cables (810) and a connecting side (120) in form of a printed circuit board (820) with electrical contacts (830) for directly contacting a mating connector (10), and a locking latch (600), in which the electrical connector (100) is automatically locked with the mating connector (10) when it is pushed into the mating connector (10), wherein a sliding element (400) is arranged inside said two-part shell (200, 300) for a displacement of a certain distance, said sliding element having a guiding pin (410 or 410'), wherein a locking latch (600) is arranged inside said sliding element, said locking latch having an elongated guide (610 or 610') for receiving the guiding pin of the sliding element, wherein said locking latch (600) is mounted rotatably inside a mount (380) of the bottom shell (300), and wherein a hook (620) on the locking latch (600) performs a short lifting movement when the sliding element (400) and guiding pin (410 or 410') is displaced axially to enable the guiding pin to move along the elongated guide of the locking latch to rotate the locking latch, so that an unlocking or locking action with the correspondingly provided mating connector (10) results.

2. The locking device according to claim 1, wherein the sliding element (400) has two guiding pins (410, 410'), and the locking latch (600) has two elongated forked guides (610, 610'), wherein the guiding pins (410, 410') engage into the forked guides (610, 610') on the locking latch (600).

3. The locking device according to claim 1, wherein the locking latch (600) is rotatably mounted by an axle (650) provided on the locking latch (600) and on the bottom shell (300).

4. The locking device according to claim 1, wherein the hook (620) of the locking latch (600) is engageable with a recess (11) on the mating connector (10) outside the shell (200, 300) for locking the electrical connector (100) to the mating connector (10) and, wherein the hook dips into the shell (200, 300) for unlocking the electrical connector with the mating connector.

5. The locking device according to claim 1, wherein a pull tab (500) is provided on the moving sliding element (400), by means of which an axial movement of the sliding element (400) can be initiated.

6. The locking device according to claim 1, wherein at least one coil spring (140) acts on the sliding element (400) in the plug-in direction.

7. The locking device according to claim 1, wherein the top shell (200) can be hooked on the connecting side in the bottom shell (300) by means of a retaining moulding (215) and the two shell parts (200, 300) can be fixed to each other at the cable side by means of two screws (150, 150').

* * * * *